Figure 1:
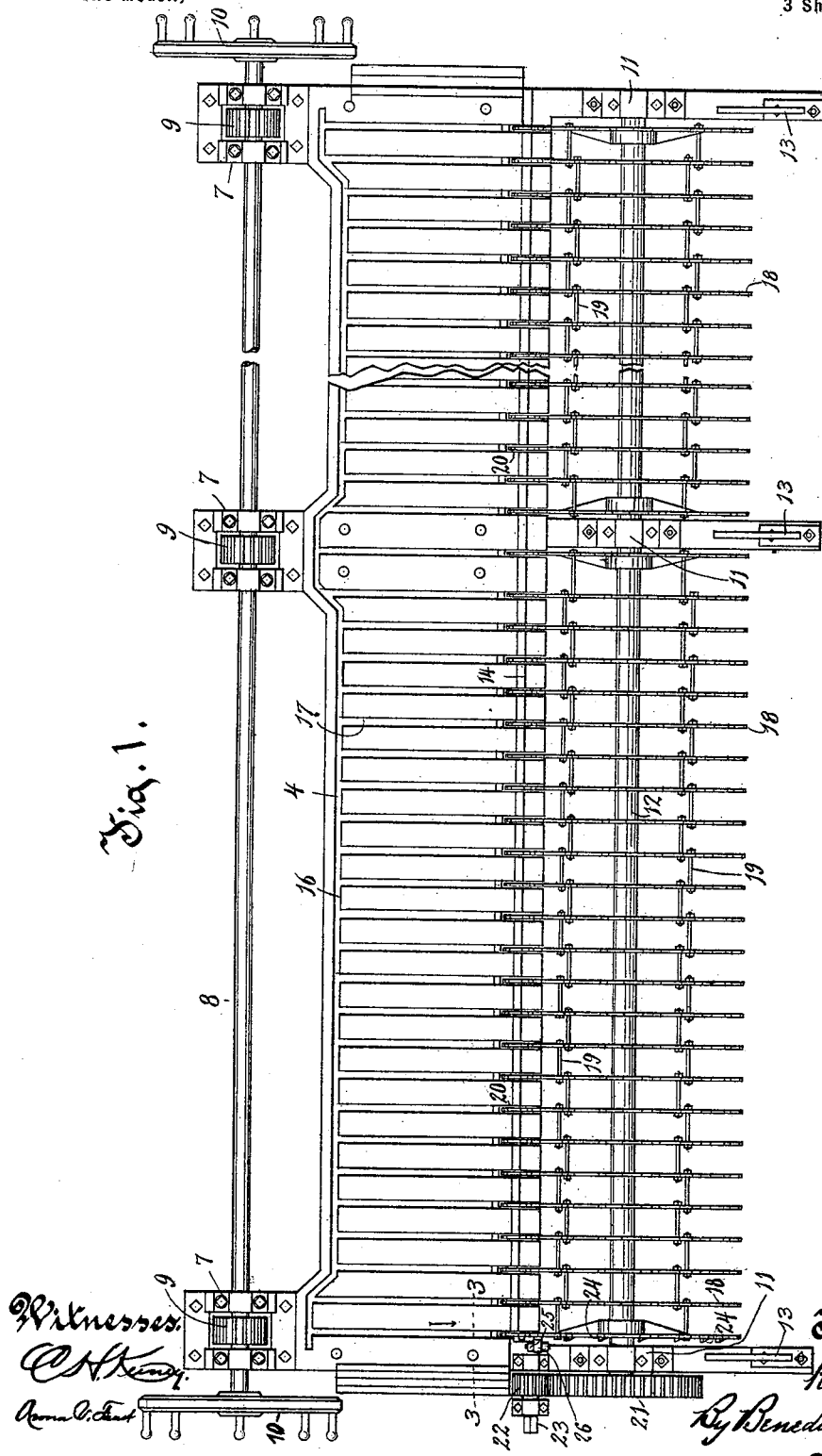

No. 631,084. Patented Aug. 15, 1899.
R. W. LUNDY.
MACHINE FOR LIFTING AND CONVEYING STRAIGHTENED BARS.
(Application filed Dec. 5, 1898.)
(No Model.) 3 Sheets—Sheet 2.

Witnesses. Inventor.
Richard W. Lundy.
By Benedict & Morsell
Attorneys.

No. 631,084. Patented Aug. 15, 1899.
R. W. LUNDY.
MACHINE FOR LIFTING AND CONVEYING STRAIGHTENED BARS.
(Application filed Dec. 5, 1898.)
(No Model.) 3 Sheets—Sheet 3.
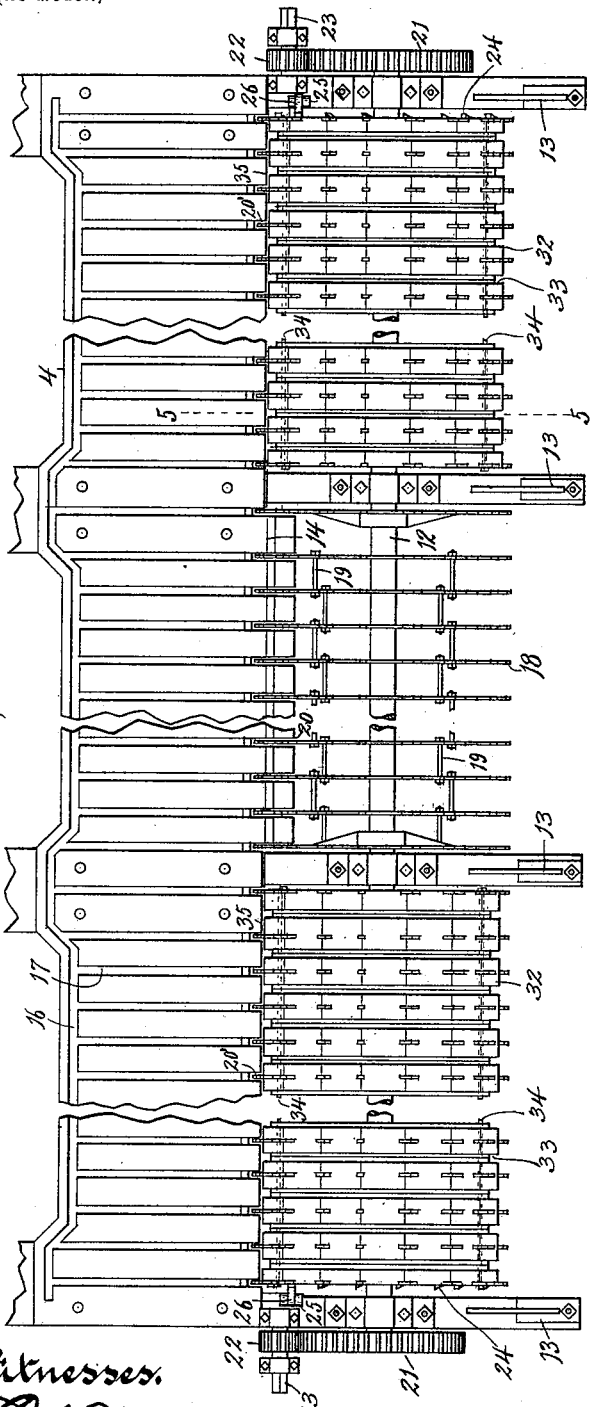
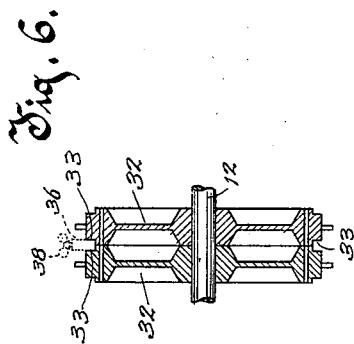
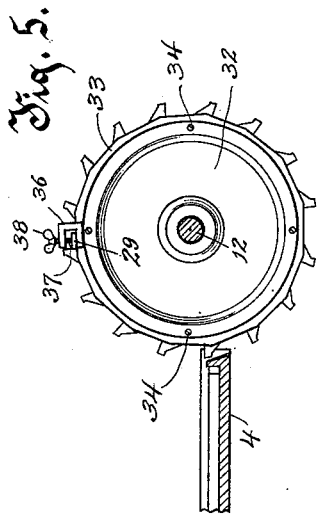
Witnesses. Inventor.
Richard W. Lundy
By Benedict and Morsell
Attorneys.

United States Patent Office.

RICHARD W. LUNDY, OF SOUTH BEND, INDIANA.

MACHINE FOR LIFTING AND CONVEYING STRAIGHTENED BARS.

SPECIFICATION forming part of Letters Patent No. 631,084, dated August 15, 1899.

Application filed December 5, 1898. Serial No. 698,263. (No model.)

*To all whom it may concern:*

Be it known that I, RICHARD W. LUNDY, of South Bend, in the county of St. Joseph and State of Indiana, have invented a new and useful Improvement in Machines for Lifting and Conveying Straightened Bars, of which the following is a description, reference being had to the accompanying drawings, which are a part of this specification.

My invention has relation to improvements in machines for lifting and conveying straightened bars.

The method now in common vogue for lifting and conveying bars after having been straightened is to employ tongs or hooks in the hands of men and to thereby convey the bars to the shear-floor, or to employ push-bars for the purpose of pushing the straightened bars, or to employ hooks for dragging said straightened bars into line with the shears. Before the products of the mills can be handled in this way the bars, &c., must be comparatively cool, and even when cold the lighter and medium sizes are more or less bent, and their merchantable condition is thereby materially and for many uses seriously damaged.

The objects of my invention are, primarily, to economize labor and to accomplish mechanically what is now most frequently done by manual labor with much physical and laborious effort, the invention contemplating the provision of improved means for lifting and conveying the bars bodily from the straightening apparatus, after said bars have been straightened, without sacrificing the perfectly straight lines of the bars and in that condition conveying them by degrees to the floor and in line with the shears by which the bars are cut to the lengths required, means being provided at each stoppage of the movement of the conveying mechanism for holding said conveying mechanism at such position that one of a series of projecting fingers therefrom will be in position to engage a straightened bar on the straightening apparatus, the said bar being lifted by the finger from the straightening apparatus on the next partial movement of the conveyer, a finger being brought and held in a position to engage a bar at each successive stoppage of the movement of the conveying mechanism.

Another object contemplated is the provision of means, in connection with the lifting and conveying mechanism, for holding the bars on said lifting and conveying mechanism, more particularly, although not necessarily, for holding irregularly-shaped bars—such as angle-bars, channel-bars, and the like—to prevent said bars from warping while cooling, the irregularly-shaped bars being more open to this danger owing to their irregular sections.

With the above primary objects in view the invention consists of the devices and parts or their equivalents, as hereinafter more fully set forth.

Figure 2:
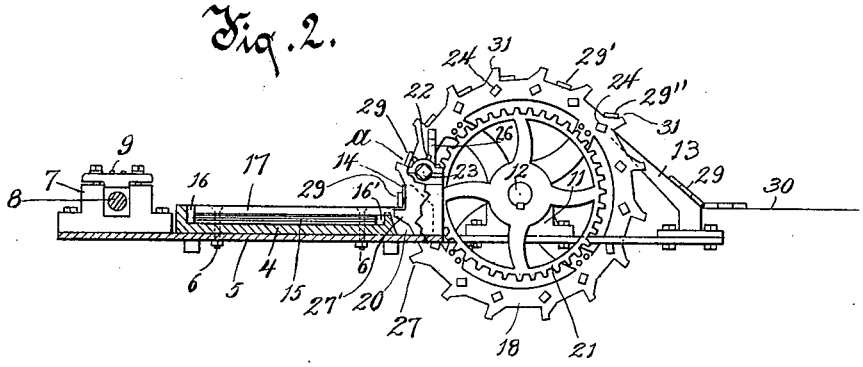
Figure 3:
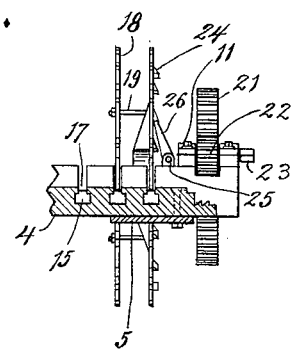

In the accompanying drawings, Figure 1 is a plan view of my invention shown in connection with the bed of a straightening-machine, said bed being broken away at a point between its ends. Fig. 2 is an end view with parts in section and parts broken away. Fig. 3 is a sectional view on the line 3 3 of Fig. 1 looking in the direction of the arrow. Fig. 4 is a plan view of my invention, showing holding mechanism in connection therewith and also showing the bed of a straightening-machine, said bed being broken away. Fig. 5 is a cross-section on the line 5 5 of Fig. 4, and Fig. 6 is a detail of two of the wheels of an end series with parts broken away.

Referring to the drawings, the numeral 4 indicates a straightening-bed, which may be of any desirable construction or may be of a construction similar to the straighening-beds illustrated in my United States Letters Patent dated October 4, 1898, and numbered, respectively, 611,694, 611,695, and 611,696. I have shown, however, a bed more nearly approximating in construction the bed illustrated in my Letters Patent No. 611,694. This bed is preferably made in sections of convenient length. A plate 5 is arranged lengthwise of each joint against the under side of the sections, said plates being held to the bed by means of bolts 6. These plates are extended outwardly beyond both side edges of the bed, and to the extensions extending out from one side are secured pillow-blocks 7, which are preferably separate from and bolted to these extensions of the plates 5. These pillow-blocks form bearings for a shaft 8, upon which shaft are mounted a series of pinions 9, and on opposite ends of the shaft are hand-wheels 10 10. The extensions of the plates 5 from the opposite side edge of the bed carry pillow-blocks 11, which are preferably bolted thereto, said pillow-blocks forming bearings for a conveyer-shaft 12. To the extreme ends of these extensions are secured the inclined arms 13 13, which form the slide. The extensions last referred to of the plates 5 are preferably formed by narrower plates, which are welded to the main plates 5.

Each section of the bed is formed or provided at or near one edge with an upwardly-extending jaw 14, which when the sections of the bed are fitted together are in line, and thereby form a continuous jaw. The bed is also provided with a series of transverse waterways 15, the ends of which are connected by means of longitudinal waterways 16 16'. By the provision of these waterways water is admitted to all parts of the bed which come in contact with the hot bars, although it is not intended that the water should rise to the surface of the bed and come in direct contact with the bars. The bed is further provided with narrow slits or spaces 17, which extend from the top surface downwardly to the waterways 15. These spaces permit expansion and prevent the warping which occurs when one side of a solid plate is constantly kept at a higher degree of heat than the other.

I have herein shown and described a straightener-bed of the general form and construction of the bed covered in my United States Letters Patent No. 611,694, dated October 4, 1898, and intended to be used in connection with a reciprocative straightening-beam having a face or jaw formed or provided thereon, said face or jaw adapted to act in conjunction with the jaw 14, and said straightening-beam also formed or provided with rack-bars adapted to be engaged by the pinions 9, the same as in said Letters Patent No. 611,694. If desired, however, and as stated at the outset of the specification, the same construction of beds and allied parts may be employed as shown in my United States Letters Patent Nos. 611,695 and 611,696, both dated October 4, 1898, or, in fact, the invention is applicable to any form of straightening apparatus by which the bars are straightened by any means and in which it is necessary to remove said bars therefrom after said bars have been straightened.

The essential feature of my present invention resides in the combination, with a straightening apparatus, of the improved form of conveying and lifting mechanism hereinbefore set forth, adapted to lift the bars bodily from the straightening apparatus after the bars have been straightened, preserving the now perfectly straight lines of the bars, and in that condition conveying them to the floor and in line with the shears by which the bars are cut to the lengths required. To this end I mount on the conveyer-shaft 12 a series of conveyer-wheels 18, which are connected together by a series of bolts 19, forming practically a continuous cylindrically-shaped conveyer. In order that the bed 4 shall not interfere with the free rotation of the conveyer, the edge of said bed adjacent to the conveyer-wheels is formed with a series of slits 20, which slits extend through the jaw 14 and also extend a sufficient distance inwardly to permit the conveyer to perform the function of lifting the bars from the straightening apparatus and to freely rotate without contact with any part of the apparatus. On one extremity of the shaft 12 is a cog-wheel 21. A pinion 22, fixed on a short shaft 23, meshes with this cog-wheel and is adapted to impart rotation thereto. The short shaft 23 may be rotated in any desirable manner—as, for instance, by having a crank-handle (not shown) fitted thereto. I do not wish, however, to be understood as confining myself to a crank-handle for turning the shaft, as other means than the crank-handle may be employed for that purpose, and where power is available friction-disks may be employed adapted to be operated either with a hand or foot lever.

The conveyer-wheel 18, located at one end of the conveyer-shaft 12, is formed on its outer face with a series of circularly-arranged beveled lugs 24. The slit 20 of the bed for this particular conveyer-wheel is widened slightly at its outer end to permit these lugs to pass therethrough freely. Pivoted to a short lug 25, extending upwardly from the bed 4, is a dog or catch 26. This dog extends upwardly and is thrown inwardly in order to be in position to engage under any of the beveled lugs 24. (See particularly Fig. 3.) Each of the conveyer-wheels, as will be seen, is provided with a series of peripherally-projecting fingers.

In explanation of the operation of my machine it is to be stated that after a bar on the bed has been straightened the operator causes rotation to be imparted to the pinion 22 or other rotating mechanism. As this pinion engages the cog-wheel 21 said cog-wheel is rotated, and consequently the conveyer-shaft 12 and the conveyer-wheels 18 fast on said shaft are rotated therewith. This turning is continued until the bar is lifted from the bed and the peripherally-extending finger (designated by the numeral 27) is in the position of the finger 27' and the bar has been lifted into the position indicated by the letter $a$. At this time the dog or catch 26 will drop under the locking-lug 25 and the next lifting-finger of the conveyer be held in position to lift and remove the next bar after having been straightened. This operation is clearly illustrated in Fig. 2 of the drawings, wherein the bars are designated by the numeral 29. When the first bar straightened has finally by repeated movements of the conveyer reached the opposite side of the conveyer, it comes in contact with the inclined arms 13 13, forming the slide, and on which arms or slide the bar, now sufficiently cooled, slides to the shearing-floor 30, which it reaches in the same perfectly straight condition as before being removed from the bed of the straightening-machine.

While I have shown my improved conveying mechanism as joined to or connected with the straightening apparatus, yet it is obvious that said conveying mechanism may be entirely separate from the straightening apparatus and arranged and held adjacent to one side edge of said apparatus, so as to coact therewith and effect the lifting of the straightened bars therefrom.

From the fact that the conveyer is more heavily weighted on one side than on the other by the straightened bars carried thereby the importance of the lugs 24 and the pivoted arm or dog 26 or their equivalents will be clearly apparent. Without means to prevent it the weight of heavy bars would cause a reversal of the direction of rotation of the conveyer. It is evident that the conveyer must be held at such points as will place each finger in its turn directly under and close to the bar to be removed from the surface of the bed. The lugs 24, therefore, are so spaced apart and the pivoted dog 26 so positioned that said dog will engage a lug and hold one of the fingers in position to engage a bar, so that on the next partial movement of the conveyer the bar is lifted by said finger from the straightening apparatus, and the next succeeding finger will be held in position to engage the next bar. By this arrangement as the movement of the conveyer is intermittently stopped each successive finger is brought in position to engage the bar, and at the same time the bars which are lifted from the straightening apparatus, are conveyed by a step-by-step movement by the conveyer until deposited on the slide, whereby a considerable time is required in conveying the bars from the straightening apparatus to the cooling-bed and said bars thereby given ample opportunity to cool.

While I prefer to effect the stopping of the conveying mechanism by the employment of the lugs 24 and the pivoted arm or dog 26, yet I do not wish to be understood as limiting myself to this particular mechanism, as any other desired mechanism can be employed for accomplishing the same purpose without departing from the spirit and scope of my invention.

It will also be noticed that the projecting fingers of the conveyer-wheels are of peculiar construction, one edge of each finger being straight and the other edge inclined or beveled, the inclined or beveled edge terminating in a shoulder 31. By this construction when the conveyer has been rotated a certain distance one of the straightened bars—for instance, the bar designated by the numeral 29'—will slide from the straight edge of one finger to the inclined edge of the next succeeding finger, and as the conveyer is further rotated said bar will assume the position on the inclined edge of the finger, as indicated at 29'', Fig. 2, and is prevented from passing entirely off of the finger by reason of the shoulder 31 until said finger carries the bar to the inclined arms 13, which form the slide, when the bar will pass off the fingers onto said slide. If the small shoulders 31 were not provided, the straightened bars would slide or roll off the finger before reaching the slide or have a tendency to tilt and be deposited edgewise onto the slide.

While I have shown in Fig. 1 of the drawings and have heretofore described only one end of the conveyer-shaft as provided with a cog-wheel similar to 21, with means for rotating said cog-wheel, and have also shown in said Fig. 1 and have heretofore described means for preventing reverse rotation of the conveyer at only one end of the machine, yet it will be understood that, if desired, all these features may be duplicated at the opposite end of the machine, as shown in Fig. 4 of the drawings. This duplication will be particularly advantageous where a straightening-bed or straightening apparatus of considerable length is employed.

In Figs. 4, 5, and 6 of the drawings I show a form of construction of the conveying and lifting mechanism adapted for the application thereto of holding mechanism. Fig. 4 shows the conveying and lifting mechanism having a central series of lifting and conveying wheels similar to the wheels 18 of Fig. 1, and designated by the same numeral. The two series of lifting and conveying wheels, however, on opposite sides of this central series are of a different form of construction. The wheels of these two end series are designated by the numeral 32. These wheels are formed with abutting central hub portions, the rim portions, and the connecting-web portions. The rim portions also abut, as clearly shown, and the opposite sides of the rim of each wheel are cut out to form angle-notches 33, the registering angle-notches of the adjacent wheels forming a rectangular recess. The wheels of these end series are held firmly together by means of long bolts 34, so that practically a solid continuous cylindrically-shaped wheel is provided on opposite ends of the conveyer-shaft. The outer wheels of these end series are provided with the beveled lugs 24, which are adapted to be engaged by the dogs or pawls 26, as in the Fig. 1 form of construction. In the Fig. 4 form of construction, also, it is advisable that the jaw 14 should extend only the distance of the central series of wheels 18, and that the slits 20 should be extended through said jaw for the accommodation of the fingers of said wheel 18, the same as in Fig. 1. The portions of the edge of the straightening bed or apparatus adjacent to the series of wheels 32, however, are unprovided with the jaw 14, and said edge of the straightening bed or apparatus is recessed, as indicated at 35 35, and in which recesses the rims of the wheels 32 fit, said rims therefore taking the place of the jaw 14, and the fingers projecting from said rims extending into the shallow slits 20'. When the bars are engaged by the fingers of the lifting mechanism said bars are necessarily laid across the rectangular recesses formed by the angle-notches 33 of the lifting and conveying wheels 32. These rectangular recesses are provided for the accommodation of holding mechanism. Any desirable form of holding mechanism may be adopted, and in the accompanying illustration of my invention I have shown holding mechanism consisting of a short channel-iron 36, the lower member of which is adapted to be seated in one of the rectangular recesses beneath the bar extending transversely across said recess. A bolt 37 is passed through the upper member of the channel-iron and its inner end caused to bear firmly against the bar near one end of said bar. This bolt may be either a screw-bolt engaging a threaded opening in the upper member of the angle-iron, or it may be a plain bolt having an outer threaded extremity adapted to be engaged by a wing-nut 38, as clearly shown in Fig. 5. Two of these holding devices are of course applied to the bar, one near each end thereof. It will be evident that the length of the bar will make no difference, as the holding devices can engage any of the series of rectangular recesses, and thereby accommodate themselves to the length of the bar. These holding devices are adapted to be applied to the lifting and conveying mechanism as soon as said lifting and conveying mechanism stops after a bar is raised from the straightening bed or apparatus, and these holding devices are removed from engagement with a bar immediately after the last stop of the lifting and conveying mechanism just preceding the discharge of the bar from said mechanism onto the slide. While I have shown these end sections of the lifting and conveying mechanism as composed of a series of separate abutting wheels held together as explained, and which is the preferable construction, yet it is obvious that each of said end sections may be a continuous integral wheel without departing from the spirit and scope of my invention, the rim of said wheel in such case being formed with a series of recesses therearound. By the provision of this holding mechanism I am enabled to hold a bar which has been lifted from the straightening bed or apparatus in a hot state, and thereby prevent the bar from warping during the cooling operation it is subjected to while being carried around by the lifting and conveying mechanism. Without the provision of this holding mechanism the bars in cooling would warp—that is to say, bars of irregular shape, such as angle-bars, channel-bars, &c. Owing to their irregular shape, these bars at some portions thereof have more metal than at other portions, and consequently contract more. By the provision of my construction, however, this difficulty is obviated. In Fig. 4 I have also shown the cog-wheels 21 and allied mechanism on opposite ends of the conveyer-shaft. This is an advantage, particularly in the case of a long shaft, which, if equipped with means for rotating it only at one end, is necessarily subjected to considerable torsional strain.

What I claim as my invention is—

1. The combination, of a straightening apparatus, a movable conveyer provided with a series of projecting fingers, said conveyer located adjacent to the straightening apparatus so as to adapt the projecting fingers to engage a straightened bar, and means adapted, when the movement of the conveyer is stopped, to hold a finger thereof in position to engage a bar, the bar being lifted from the straightening apparatus on the succeeding movement of the conveyer, and a finger being brought and held in the position referred to on each successive stoppage of the movement of the conveyer.

2. The combination, of a straightening apparatus, a rotatable conveyer provided with a series of projecting fingers, said conveyer located adjacent to the straightening apparatus so as to adapt the projecting fingers to engage a straightened bar, and means adapted, when the rotation of the conveyer is stopped, to hold said conveyer at such position that a finger thereof is in position to engage a straightened bar on the straightening apparatus, the bar being lifted by the finger from the straightening apparatus on the succeeding partial movement of the conveyer, and a finger being brought and held in the position referred to at each successive stoppage of the rotation of the conveyer.

3. The combination, of a straightening apparatus, a rotatable, cylindrical conveyer having a series of projecting fingers, said conveyer located adjacent to the straightening apparatus so as to adapt the projecting fingers to engage a straightened bar, and means adapted, when the rotation of the conveyer is stopped, to hold said conveyer at such position that a finger thereof is in position to engage a straightened bar on the straightening apparatus, the bar being lifted by the finger from the straightening apparatus on the succeeding partial movement of the conveyer, a finger being brought and held in the position referred to at each successive stoppage of the rotation of the conveyer.

4. The combination, of a straightening apparatus, a rotatable conveyer provided with a series of projecting fingers, and also provided with a series of lugs, said conveyer located adjacent to the straightening apparatus so as to adapt the projecting fingers to engage a straightened bar, and a pivoted dog adapted, when the rotation of the conveyer is stopped, to engage a lug and hold said conveyer at such position that a finger thereof is in position to engage a straightened bar on the straightening apparatus, said bar being lifted by the finger from the straightening apparatus on the succeeding partial rotation of the conveyer, the said lugs being so positioned as to be engaged by the dog in order to hold a finger in the position referred to on each successive stoppage of the rotation of the conveyer.

5. The combination, with a conveyer having a series of circumferentially-projecting fingers adapted to engage and lift straightened bars, each of said fingers formed with a straight edge and with an inclined edge, the inclined edge terminating in a shoulder, of means for rotating said conveyer.

6. The combination, of a straightening apparatus having a jaw against which bars are successively forced and straightened, said jaw having a series of slits extending therein from one edge of the straightening apparatus, a rotatable conveyer provided with a series of projecting fingers, said conveyer located adjacent to the straightening apparatus so as to adapt the fingers to extend into the slits thereof and to engage a straightened bar, and means adapted, when the rotation of the conveyer is stopped, to hold said conveyer at such position that a finger thereof is in position to engage a bar, the said bar being lifted by the finger from the straightening apparatus on the succeeding movement of the conveyer, a finger being brought and held in the position referred to on each successive stoppage of the movement of the conveyer.

7. The combination of a conveyer provided with a series of projecting fingers adapted to engage and lift straightened bars, and said conveyer also provided with a series of recesses therein, holding mechanism applied to the recesses, and adapted to engage a bar carried by the conveying mechanism, and means for actuating the conveyer.

8. The combination, of a conveyer consisting of a cylindrically-shaped wheel, provided with a series of projecting fingers adapted to engage and lift straightened bars, said conveyer also provided with a series of recesses, holding devices adapted to fit said recesses and engage a bar, and means for rotating the conveyer.

9. The combination, of a conveyer consisting of a series of wheels secured together and provided with projecting fingers adapted to engage and lift straightened bars, a series, or a plurality of series, of said wheels being adjacent and abutting against each other, and the adjacent edges of the rims of said series of wheels provided with registering angle-notches forming recesses, holding mechanism fitting said recesses and adapted to engage a bar, and means for rotating the conveyer.

10. The combination, of a straightening apparatus, a conveyer provided with a series of projecting fingers, said conveyer located adjacent to the straightening apparatus so as to adapt the fingers of the conveyer to engage a straightened bar and carry the same from the straightening apparatus onto the conveyer, and said conveyer also provided with a series of recesses therein, holding mechanism applied to the recesses and adapted to engage a bar carried by the conveyer, and means for actuating the conveyer.

In testimony whereof I affix my signature in presence of two witnesses.

RICHARD W. LUNDY.

Witnesses:
A. L. MORSELL,
ANNA V. FAUST.